United States Patent
Tong et al.

(10) Patent No.: US 11,982,107 B2
(45) Date of Patent: May 14, 2024

(54) LOCKING DEVICE FOR USE IN LOGISTIC MANAGEMENT, A CONTROL SYSTEM FOR THE LOCKING DEVICE AND A METHOD FOR CONTROLLING THE LOCKING DEVICE

(71) Applicant: Logistics and Supply Chain MultiTech R&D Centre Limited, Pok Fu Lam (HK)

(72) Inventors: Chi Hung Tong, Pok Fu Lam (HK); Hung Kwan Chen, Pok Fu Lam (HK); Wai Tong Luk, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 872 days.

(21) Appl. No.: 16/295,187

(22) Filed: Mar. 7, 2019

(65) Prior Publication Data
US 2020/0284066 A1    Sep. 10, 2020

(51) Int. Cl.
*E05B 47/00* (2006.01)
*E05B 47/06* (2006.01)
*G06Q 10/08* (2023.01)

(52) U.S. Cl.
CPC .............. *E05B 47/06* (2013.01); *G06Q 10/08* (2013.01)

(58) Field of Classification Search
CPC ............ E05B 2047/0095; E05B 47/00; E05B 2047/0018; E05B 45/06; E05B 37/0065; E05B 41/00; G06Q 10/08; G07C 9/00; G07C 9/00309; G07C 2009/00769; G07C 9/00174; G07C 2009/00333; G07C 2009/00357; G07C 2209/62
See application file for complete search history.

(56) References Cited

U.S. PATENT DOCUMENTS

| | | | | |
|---|---|---|---|---|
| 8,201,423 B1* | 6/2012 | Misner | ................. | E05B 35/105 |
| | | | | 70/284 |
| 9,342,936 B2* | 5/2016 | Scalisi | ................. | H04N 7/188 |
| 9,460,480 B2* | 10/2016 | Woodard | ............... | G07F 9/002 |
| 9,652,917 B2* | 5/2017 | Johnson | ............... | H04W 4/027 |
| 9,674,124 B1* | 6/2017 | Fisher | ................. | H04W 4/029 |
| 9,894,066 B2* | 2/2018 | Conrad | ................ | H04W 12/08 |

(Continued)

FOREIGN PATENT DOCUMENTS

| | | | | |
|---|---|---|---|---|
| CN | 104766394 | | 7/2015 | |
| CN | 105089373 | | 11/2015 | |
| WO | WO2010151901 A1 * | 12/2010 | ........... E05B 39/005 |

OTHER PUBLICATIONS

Chinese Office Action dated Feb. 23, 2024.

*Primary Examiner* — Florian M Zeender
*Assistant Examiner* — Milena Racic
(74) *Attorney, Agent, or Firm* — Renner, Kenner, Greive, Bobak, Taylor & Weber

(57) ABSTRACT

A system and method for controlling a locking device used in logistic management, the method including the step of receiving a command associated with an operation of a mechanical locking device; validating the received command and a protocol associated with the command; and manipulating the mechanical locking device operable in at least a locking state and an unlocking state; wherein the mechanical locking device is arranged to operate in response to a successful validation of the command associated with one of at least two protocols.

24 Claims, 7 Drawing Sheets

(56) References Cited

U.S. PATENT DOCUMENTS

| | | | |
|---|---|---|---|
| 9,996,999 B2* | 6/2018 | Conrad | G07C 9/00174 |
| 10,392,835 B2* | 8/2019 | Ramakrishna | E05B 67/003 |
| 10,614,646 B1* | 4/2020 | Douglass | H01H 9/281 |
| 10,779,115 B1* | 9/2020 | Bartucci | H04W 4/029 |
| 10,783,731 B2* | 9/2020 | Imanuel | G07C 9/28 |
| 11,280,112 B2* | 3/2022 | Li | E05B 37/0065 |
| 11,391,064 B2* | 7/2022 | Almomani | E05B 47/0001 |
| 11,639,617 B1* | 5/2023 | Farber | E05B 49/006 |
| | | | 70/278.7 |
| 2004/0178880 A1* | 9/2004 | Meyer | G06Q 10/0833 |
| | | | 340/5.3 |
| 2012/0280783 A1* | 11/2012 | Gerhardt | H04L 63/08 |
| | | | 340/5.6 |
| 2013/0210360 A1* | 8/2013 | Ljung | H04W 4/80 |
| | | | 455/41.2 |
| 2013/0293351 A1* | 11/2013 | Kuenzi | G07C 9/00896 |
| | | | 340/5.73 |
| 2014/0191848 A1* | 7/2014 | Imes | H04B 5/0031 |
| | | | 340/10.5 |
| 2014/0375421 A1* | 12/2014 | Morrison | H04W 12/065 |
| | | | 340/5.61 |
| 2015/0027178 A1* | 1/2015 | Scalisi | E05B 47/026 |
| | | | 292/144 |
| 2015/0040205 A1* | 2/2015 | Van Till | H04L 63/08 |
| | | | 726/9 |
| 2015/0170447 A1* | 6/2015 | Buzhardt | G07C 9/00182 |
| | | | 340/5.2 |
| 2015/0170448 A1* | 6/2015 | Robfogel | G07C 9/20 |
| | | | 340/5.61 |
| 2015/0199859 A1* | 7/2015 | Ouyang | H04L 9/30 |
| | | | 340/5.61 |
| 2015/0269799 A1* | 9/2015 | Martinez | G07C 9/00309 |
| | | | 70/277 |
| 2017/0030109 A1* | 2/2017 | Duncan | E05B 47/0012 |
| 2017/0069154 A1* | 3/2017 | Hilton | E05B 71/00 |
| 2018/0135337 A1* | 5/2018 | Johnson | G08B 3/10 |
| 2019/0333301 A1* | 10/2019 | Imanuel | G07C 9/00571 |

* cited by examiner

LOCKING DEVICE FOR USE IN LOGISTIC MANAGEMENT, A CONTROL SYSTEM FOR THE LOCKING DEVICE AND A METHOD FOR CONTROLLING THE LOCKING DEVICE

TECHNICAL FIELD

The present invention relates to a locking device for use in logistic management, a control system for the locking device and a method for controlling the locking device, and particularly, although not exclusively, to a reusable electronic locking or sealing device for use in secure transport tracking.

BACKGROUND

In an example operation in logistic or supply chain management, goods or products may be transported from a dispatch location to a receipt location, and it is required that the transported items are securely sealed or locked before reaching the receipt location, i.e. after security check at the dispatch location before dispatching and during transportation, to ensure that the cargo or the container contains only the items being checked but not any unauthorized items.

SUMMARY OF THE INVENTION

In accordance with a first aspect of the present invention, there is provided a method for controlling a locking device used in logistic management, comprising the step of: receiving a command associated with an operation of a mechanical locking device; the received command and a protocol associated with the command; and manipulating the mechanical locking device operable in at least a locking state and an unlocking state; wherein the mechanical locking device is arranged to operate in response to a successful validation of the command associated with one of at least two protocols.

In an embodiment of the first aspect, the command includes at least a sealing command and an unsealing command.

In an embodiment of the first aspect, the step of manipulating the mechanical locking device includes the step of manipulating the mechanical locking device to operate in the locking state in response to a successful validation of a first sealing command of a first protocol.

In an embodiment of the first aspect, the step of manipulating the mechanical locking device further includes the step of manipulating the mechanical locking device to operate in the unlocking state in response to a successful validation of a first unsealing command of the first protocol.

In an embodiment of the first aspect, the step of validating the received command and the protocol includes the step of restricting validating only a first unsealing command of the first protocol after the successful validation of the first sealing command.

In an embodiment of the first aspect, the method further comprises the step of temporarily storing a second sealing command of a second protocol when the mechanical locking device is operating in the locking state upon successful validation of the first sealing command.

In an embodiment of the first aspect, the method further comprises the step of manipulating the mechanical locking device to operate in the locking state in response to a successful validation of the second sealing command of the second protocol, after a successful validation of the first unsealing command.

In an embodiment of the first aspect, the step of validating the received command and the protocol further includes the step of restricting validating only a second unsealing command of the second protocol after the successful validation of the second sealing command.

In an embodiment of the first aspect, the method further comprises the step of decoding a data packet including the received command and at least temporally storing the received command.

In an embodiment of the first aspect, the data packet includes an RFID data packet.

In accordance with a second aspect of the present invention, there is provided a control system for a locking device used in logistic management, comprising: an interface arranged receive a command associated with an operation of a mechanical locking device, wherein the mechanical locking device is operable in at least a locking state and an unlocking state; a controller arranged to validate the received command and a protocol associated with the command, and to manipulate the mechanical locking device based on a validation result of the received command and the protocol; wherein the mechanical locking device is arranged to operate in response to a successful validation of the command associated with one of at least two protocols.

In an embodiment of the second aspect, the command includes at least a sealing command and an unsealing command.

In an embodiment of the second aspect, the controller is arranged to manipulate the mechanical locking device to operate in the locking state in response to a successful validation of a first sealing command of a first protocol.

In an embodiment of the second aspect, the controller is further arranged to manipulate the mechanical locking device to operate in the unlocking state in response to a successful validation of a first unsealing command of the first protocol.

In an embodiment of the second aspect, the controller is further arranged to restrict to only validating a first unsealing command of the first protocol after the successful validation of the first sealing command.

In an embodiment of the second aspect, the system further comprises a register arranged to temporarily storing a second sealing command of a second protocol when the mechanical locking device is operating in the locking state upon successful validation of the first sealing command.

In an embodiment of the second aspect, the controller is further arranged to manipulate the mechanical locking device to operate in the locking state in response to a successful validation of the second sealing command of the second protocol, after a successful validation of the first unsealing command.

In an embodiment of the second aspect, the controller is further arranged to restrict to only validating a second unsealing command of the second protocol after the successful validation of the second sealing command.

In an embodiment of the second aspect, the system further comprises a decoder arranged to decode a data packet including the received command.

In an embodiment of the second aspect, the system further comprises at least one register arranged to store the received command for further processing.

In an embodiment of the second aspect, the at least one register is further arranged to store a lock token to indicate a current state of the mechanical locking device.

In an embodiment of the second aspect, the at least one register is further arranged to maintain a tracked record associated with the operation of the operation of the mechanical locking device and/or the validation result.

In an embodiment of the second aspect, the interface includes at least one of a wireless communication interface and a manual input interface.

In an embodiment of the second aspect, the wireless communication interface includes an RFID communication interface.

In an embodiment of the second aspect, the at least two protocols includes a plurality of security protocols each being independently processed by the controller under a respective tracking logic.

In accordance with a third aspect of the present invention, there is provided a locking device for use in logistic management, comprising: a mechanical locking device arranged to secure an object when operating in the locking state; and a control system in accordance with the second aspect.

In an embodiment of the third aspect, the locking device further comprises a tracking device arranged to track a position of the object secured by the mechanical locking device.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, electronic seal lock may be used for transport monitoring in logistic industry. The lock may be further equipped with tracking/positioning device such as GPS for location tracking. In addition, the lock may further include an RFID module for seamless communication, e.g. for passing secret value/passcodes for sealing and unsealing operations.

Figure 1:
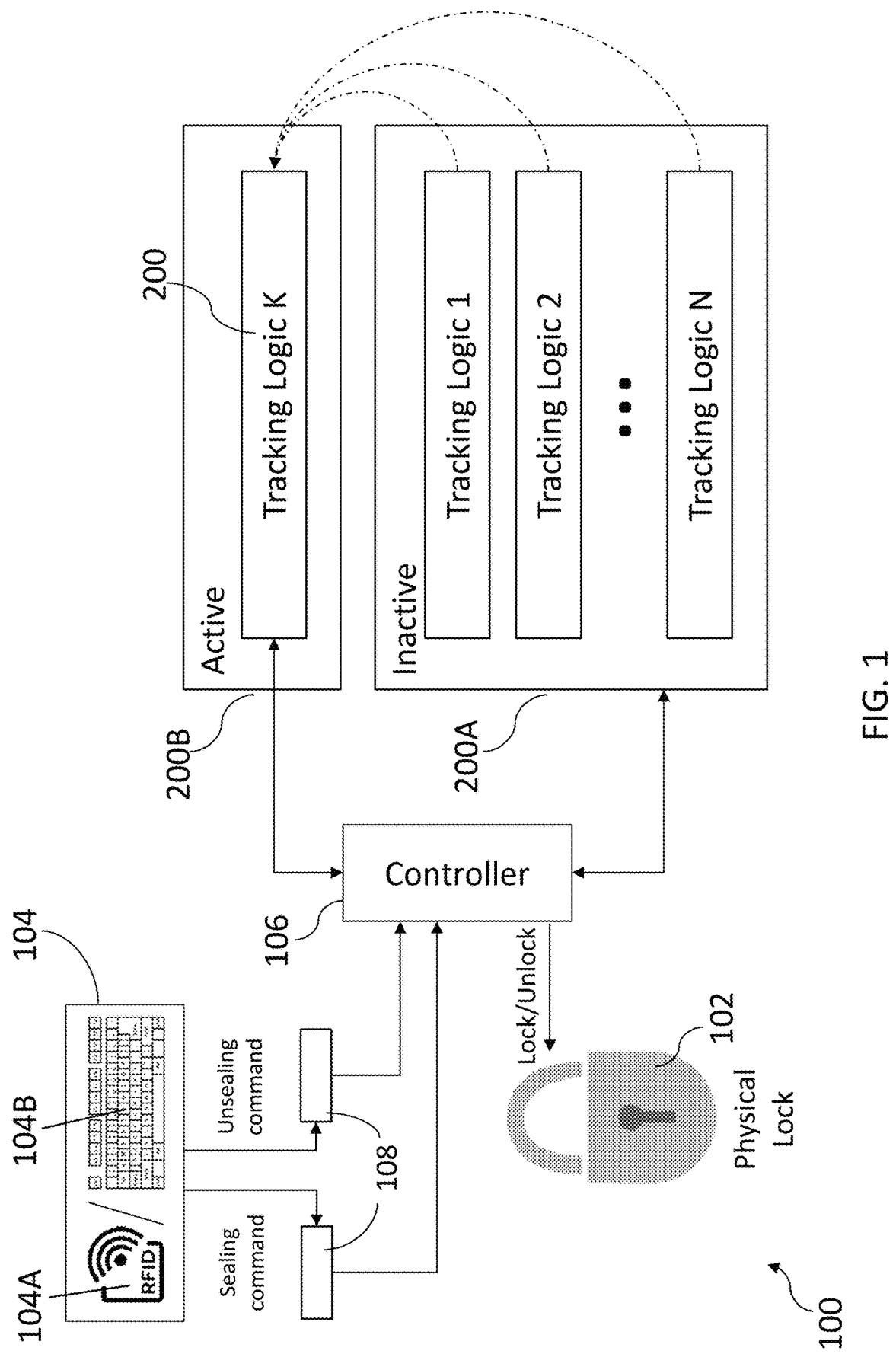
FIG. 1 is a block diagram showing a locking device for use in logistic management in accordance with an embodiment of the present invention.

With reference to FIG. 1, there is provided an example embodiment of a locking device 100 for use in logistic management. The locking device 100 may include a mechanical locking device, such as a mechanical lock 102, which may be used to secure an object when operating in the locking state. The mechanical lock 102 may also be "unlocked", so as to reveal or at least to allow an access to objects contained in a container when the lock has been unlocked with the container opened.

In this embodiment, the mechanical locking device 102 is controllable by a control system. The control system comprises: an interface 104 arranged receive a command associated with an operation of a mechanical locking device 102, wherein the mechanical locking device 102 is operable in at least a locking state and an unlocking state; and a controller 106 arranged to validate the received command and a protocol associated with the command, and to manipulate the mechanical locking device 102 based on a validation result of the received command and the protocol; wherein the mechanical locking device 102 is arranged to operate in response to a successful validation of the command associated with one of at least two protocols.

Referring to FIG. 1, the controller 106 is arranged to execute instructions associated with a plurality of tracking logic, in which each of the tracking logic may be different from each other. For example, each of the tracking logic may be implemented to comply with a security protocol required by ports or terminals in different countries.

Preferably, the controller 106 of the locking device 100 may process commands or tracking logics of at least two protocols such that the locking device 100 may be used for transporting a secured object to at least two destination points, each requiring the transported object being secured or seal under different security protocols.

Figure 2:
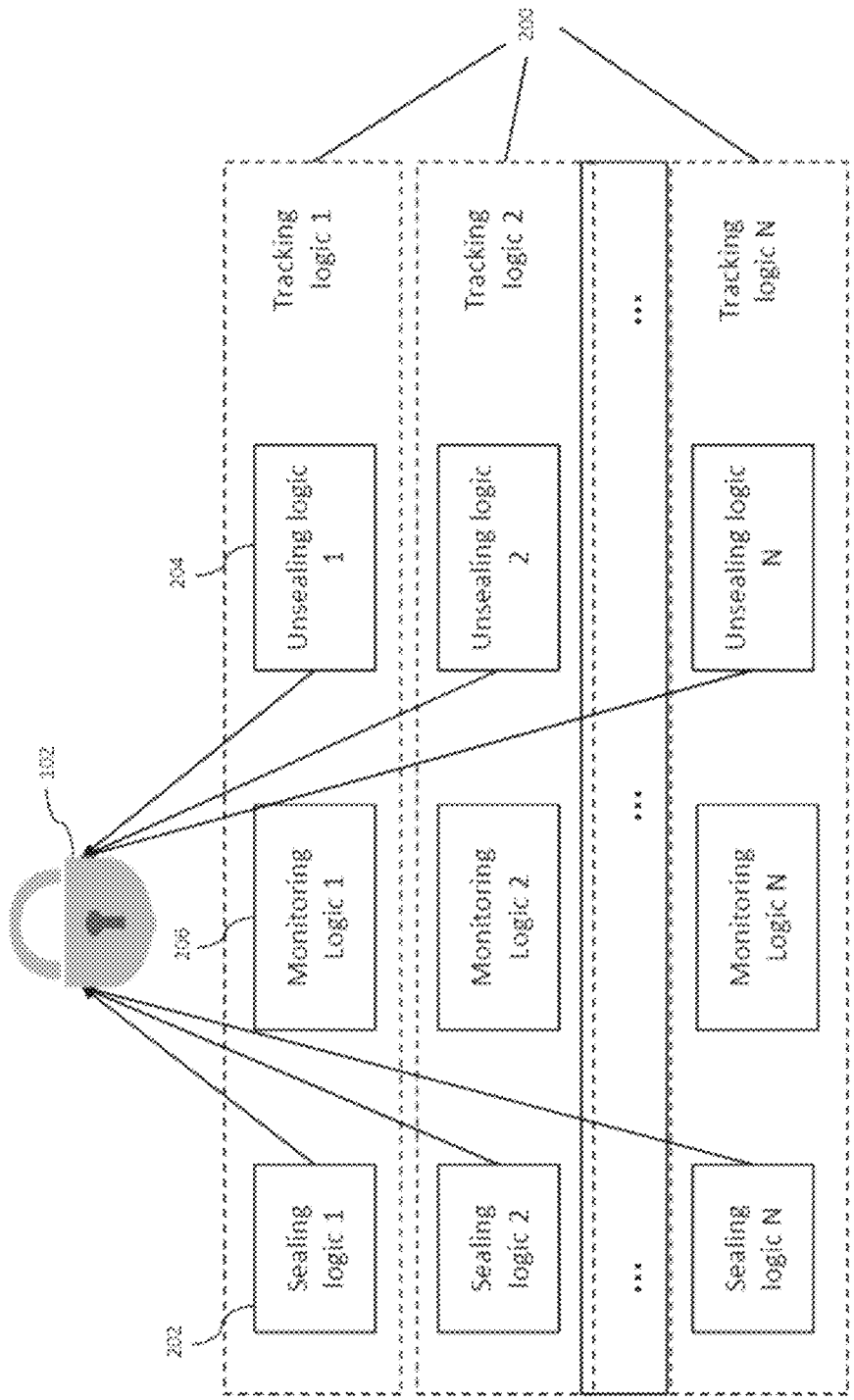
FIG. 2 is an illustration of an operation of the locking device in FIG. 1, wherein the locking device is designed to be sealed or unsealed using a plurality of tracking logic.

With reference also to FIG. 2, each of the tracking logic 200 may be implemented with executable instructions associated with different operation of the locking device 100. Preferably, each of the tracking logic 200 includes at least a pair of sealing 202 and unsealing logic 204, such that the controller 106 may manipulate, in particular sealing and unsealing, the mechanical locking device 102 by processing respectively a sealing command 202 and an unsealing command 204.

In this example, the mechanical locking device 102 may be unsealed upon execution of instructions of the unsealing logic 204 in each of the tracking logic. More preferably, each of the tracking logics is independent to each other, such that the mechanical locking device 102 may only be unsealed if and only if the sealing and unsealing logic 202, 204 belonging to the same tracking logic 200 are executed.

In some example operations, it may require more than one sealing and unsealing mechanism along the same transhipment. As one example, the transportation may pass through two different regions of jurisdiction, e.g. from one city/country to another city/country, which may require distinct sealing and unsealing mechanism subject to the regulation or law. Different sealing and unsealing mechanism may require changes in security protocol in software or mean of communication for sealing/unsealing.

In another example embodiment, the goods' owner of that transportation may transfer to ownership of the transportation unit to another party which they may not want to share the same sealing and unsealing mechanism for security reason.

The sealing and unsealing mechanism may be different in various way, such as but not limited to, by changing secret values for sealing/unsealing; by changing the interface or communication means for sealing/unsealing, e.g. RFID communication and manual input; or by changing the security protocol in instructions executable by the controller.

In one example embodiment, in order to change the sealing/unsealing mechanism during the same trans-shipment, it may requires having more than one sealing/unsealing mechanism implemented in an electronic lock or an e-lock.

Preferably, the electronic lock may be implemented with multiple sealing/unsealing mechanisms co-existing in a system. More preferably, the system should also include protective measure prevents security breaches. For example, the system may prevent a user unsealing the lock with one unsealing mechanism which has been locked using another sealing mechanism in a different security protocol or tracking logic. Therefore it may be more preferable that the system executes one sealing/unsealing mechanism that is not intervenable by another process with another sealing/unsealing mechanism without proper authorization.

Referring to FIG. 2, each party involved in the same transhipment may include its own set of Sealing Logic 202 (SL) and Unsealing Logic 204 (UL). Each pair of these Sealing/Unsealing logic may be encapsulated in a process or instruction set that may be considered as a complete Tracking Logic 200 (TL). There may be also some monitoring logic 206 inside TL, such as checking the sensors' data of the electronic lock 100 or tracking the GPS signal along the transportation.

Multiple tracking logics 200 may co-exist in a single electronic lock 100 so that the system may switch between tracking logics 200. Thus, the electronic lock 100 may seamlessly handover the control of the electronic lock 100 along the same transhipment, without the need of multiple mechanical locking devices.

Preferably, every unsealing logic 204, despite belonging to different tracking logics 200, may be used unseal the physical lock 102. It may be more preferable that sealing and unsealing has to be done in a pair under the same tracking logic 200 as shown in FIG. 2.

For example, upon receiving a sealing or unsealing command at the interface 104, the controller 106 may then validate the received command as well as a protocol associated with the command, following the rules below:

Sealing=$TL_K(SL_K)$ where $K=1 \ldots N$;

Unsealing=$TL_K(UL_K|SL_K)$ where $K=1 \ldots N$; and

Forbidden operation: $TL_K(UL_M|SL_K)$ where $K \neq M$;

wherein:
$TL_K$=$K^{th}$ tracking logic;
$SL_K$=sealing logic belonging to the $K^{th}$ tracking logic; and
$UL_K$=unsealing logic belonging to the $K^{th}$ tracking logic.

By providing a restriction to tracking logic 200 or the instructions executable by the controller 106, it is ensured that the controller 106 may only process or validate an unsealing command 204 of a certain protocol 200 after the mechanical locking device 102 is sealed as a result of a successful validation of a sealing command 202 in the same protocol 200 in a previous operation.

With reference back to FIG. 1, the control system further comprises an interface 104 for receiving a command associated with the operation of the mechanical locking device 102. Preferably, wireless communication interface such as RFID 104A may be used to facilitate providing input commands such as sealing and unsealing commands to the controller 106 for further processing. The commands may be embedded in an RFID data packet which may be wirelessly transmitted to the RFID receiver in the locking device 100.

The data packet may be encoded to enhance the security of the transmitted information, and may be decoded using a decoder, or instructions executable by the controller 106 for decoding the data packet. The RFID interface 104A may require minimal human intervention for sealing and unsealing the locking device. Alternatively, as required by some countries or recipients, manual input interface 104B may be included instead, or as additional means for inputting commands for manipulating the locking device 100.

Optionally, the control system further comprises at least one storage memory device or register 108 for temporally storing data which might be accessed or retrieved by the controller. For example, the register 108 may store the received commands, which have been decoded by a decoder upon received from the interface 104, before being processed or validated.

In one preferable embodiment, the locking device 100 may be an electronic lock system, comprising a software controller 106 or processor arranged to interact or process with the tracking logic 200, physical lock 102 and the received sealing/unsealing commands. The received RFID data packet may be decoded and stored into at least two registers 108, one for sealing command while another one for unsealing command. Additional registers for storing different commands may also be used in some alternative embodiments. The device 100 may also be provided with an input interface 104 for receiving the commands for manipulating the physical lock 102.

Figure 3A:
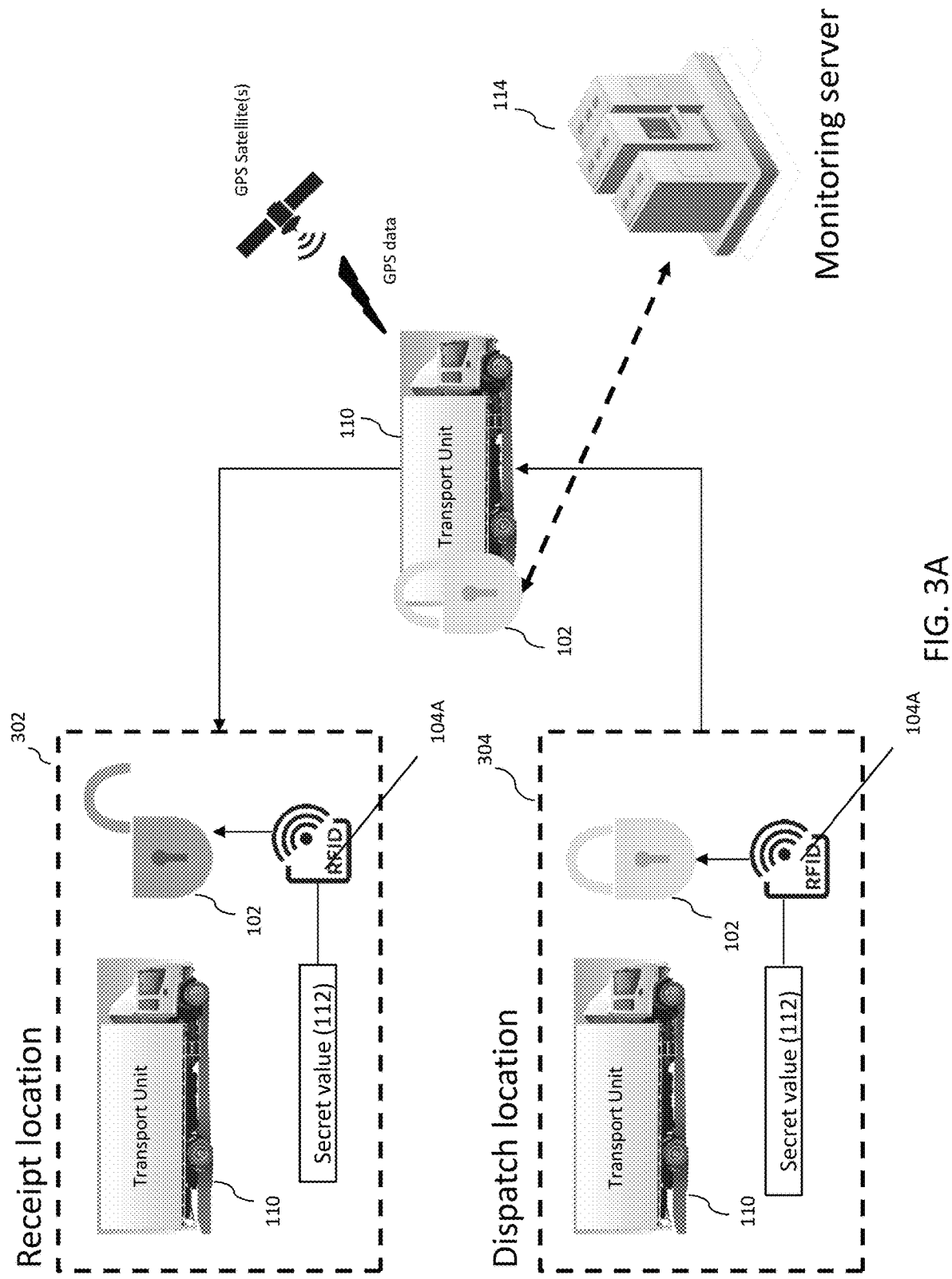
FIG. 3A is an illustration of an example logistic operation of a transport unit secured by the locking device in FIG. 1, between a single dispatch location to a single receipt location.

With reference to FIG. 3A, there is shown an example operation of a locking device 100 for use in logistic management. In this example, there may be only one sealing/unsealing mechanism exists in the system as the transhipment involve only a single dispatch location 302 to a single receipt location 304.

At the dispatch location 302, the electronic lock 102, being attached to the transportation vehicle 110, may be sealed through submitting a secret value 112 into the electronic lock system 100 through an interface like RFID 104A.

Preferably, a tracking device may be included to track a position of the object 110 secured by the mechanical locking device 102. During transportation to the receipt location 304, the status of the same electronic lock 102 in transit may be closely monitored, e.g. GPS location of the vehicle 110 or any sensor data obtained from the electronic lock 102. These sensor data is sent to a remote monitoring server 114 to evaluate the health of the electronic lock 102 and the route of the vehicle 110.

At the receipt location 302, the electronic lock 102 attached to the vehicle 110 may be unsealed through submitting the same secret value 112 into the electronic lock system 100. The result of the transportation monitoring can be referenced to determine whether the electronic lock 102 has been tampered.

Figure 3B:
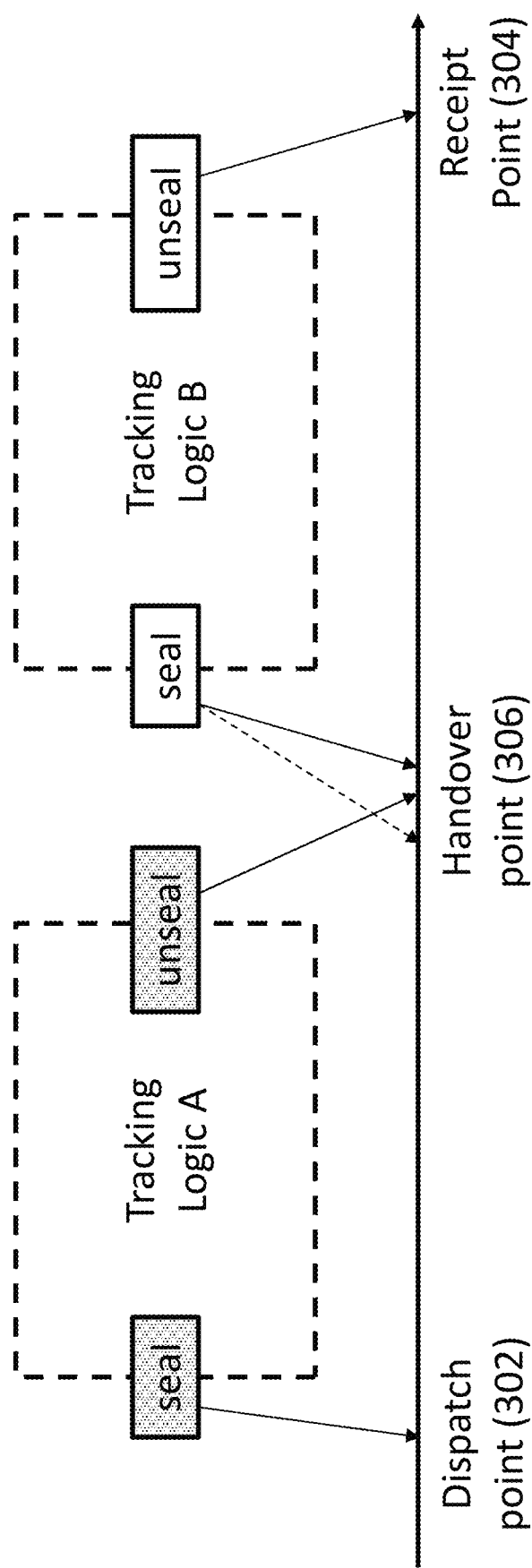
FIG. 3B is an illustration of another example logistic operation of a transport unit secured by the locking device in FIG. 1, between a single dispatch location to a single receipt location via a handover point between the two locations.

With reference to FIG. 3B, there is shown an alternative logistic operation, in which an additional handover point 306 exists between the initial dispatch point 302 and the final receipt point 304. At the handover point 306, the system may need to change the sealing/unsealing mechanism so as to switch the tracking logic or the security protocol from one to another, as the requirement of the handover point 306 and the receipt point 304 may not be the same.

Preferably, at the handover point 306, the controller 106 may be first unseal the lock 102 and halt the prior tracking logic A and seal the lock 102 back using the upcoming tracking logic B. The sealing and unsealing operations are preferably in the following sequence:
1. Sealed by tracking logic A ($SL_A$) at dispatch point
2. Unsealed by tracking logic A ($UL_A$) at handover point
3. Sealed by tracking logic B ($SL_B$) at handover point 4. Unsealed by tracking logic B ($UL_B$) at receipt point Since the lock 102 is sealed by tracking logic A, both $SL_B$ or $UL_B$ is unable to seal or unseal it and the electronic lock 102 has to wait $UL_A$ to unseal the lock 102 and release the control by tracking logic A.

However, the above sequence may not always occur in some example operations. For example, if the system 100 receives the sealing and unsealing commands through RFID readers 104A where they are placed closely together, it will be difficult to ensure a correct sequence.

For example, it is possible that $SL_B$ is received and processed before $UL_A$ as illustrated by the dotted line arrow in FIG. 3B. In such case, it may cause deadlock or incorrect operation as the system is occupied or jammed by handling $SL_B$ but not able to process the subsequent $UL_A$.

It may also happen that there is another tracking logic C that tries to seal the lock 102 concurrently with tracking logic B which results in a race of lock sealing. This may lead to a wrong sequence of tracking logic or even collision (i.e. both tracking logic are allowed to seal the lock).

Preferably, the controller 106 in the electronic lock may handles sealing and unsealing command separately and ensure the mutual exclusion of multiple tracking logics.

Upon receiving the sealing and unsealing commands, prior to validating any of the received commands, the system may store the sealing and unsealing commands separately into two different registers 108, instead of putting them into a single processing queue.

The controller 106 may periodically fetch the commands from these two sealing and unsealing registers 108. This periodicity can be achieved through task-multiplexing or multi-threading.

In task-multiplexing, the controller may run the logic flow for sealing at time T and run the logic flow for unsealing at time T+N on one single processor. Alternatively, in multi-threading, the controller may run the logic flow for sealing and unsealing in parallel on two different logic processor.

The controller 106 may maintains a global lock token, e.g. in another register, which will only be issued to the active tracking logic and is released only when the active tracking logic halts. This global lock token ensures that the sealing and unsealing logic are done under the same tracking logic. Either sealing or unsealing logic from other tracking logic is unable to intervene the current active one.

The controller periodically, preferably by task-multiplexing or multi-threading, look for the sealing and unsealing commands in registers 108. Upon receiving a sealing command 202, the controller may locate a corresponding tracking logic in inactive region 200A and bring it into active state 200B for operation. Among all the tracking logic 200 managed by the controller 106, there may be multiple tracking logics 200 being inactive while only one tracking logic 200 being active at a time.

To ensure mutual exclusion between tracking logics, i.e. only one active tracking logic 200 operating at a time, the controller 106 may schedule and maintain a single lock token in the entire system 100. Only the active tracking logic 200 is able to obtain the lock token. Any program sequence which does not have the lock token is forbidden to be executed in the system 100. If there is an active tracking logic 200 that is not able to obtain a lock token, it may wait for a certain time limit until the lock token is released.

By running the active tracking logic, the controller 106 communicates with physical lock 102 for sealing or unsealing the lock, based on the validation results of the sealing or unsealing commands received from the interface 104.

Figure 4:
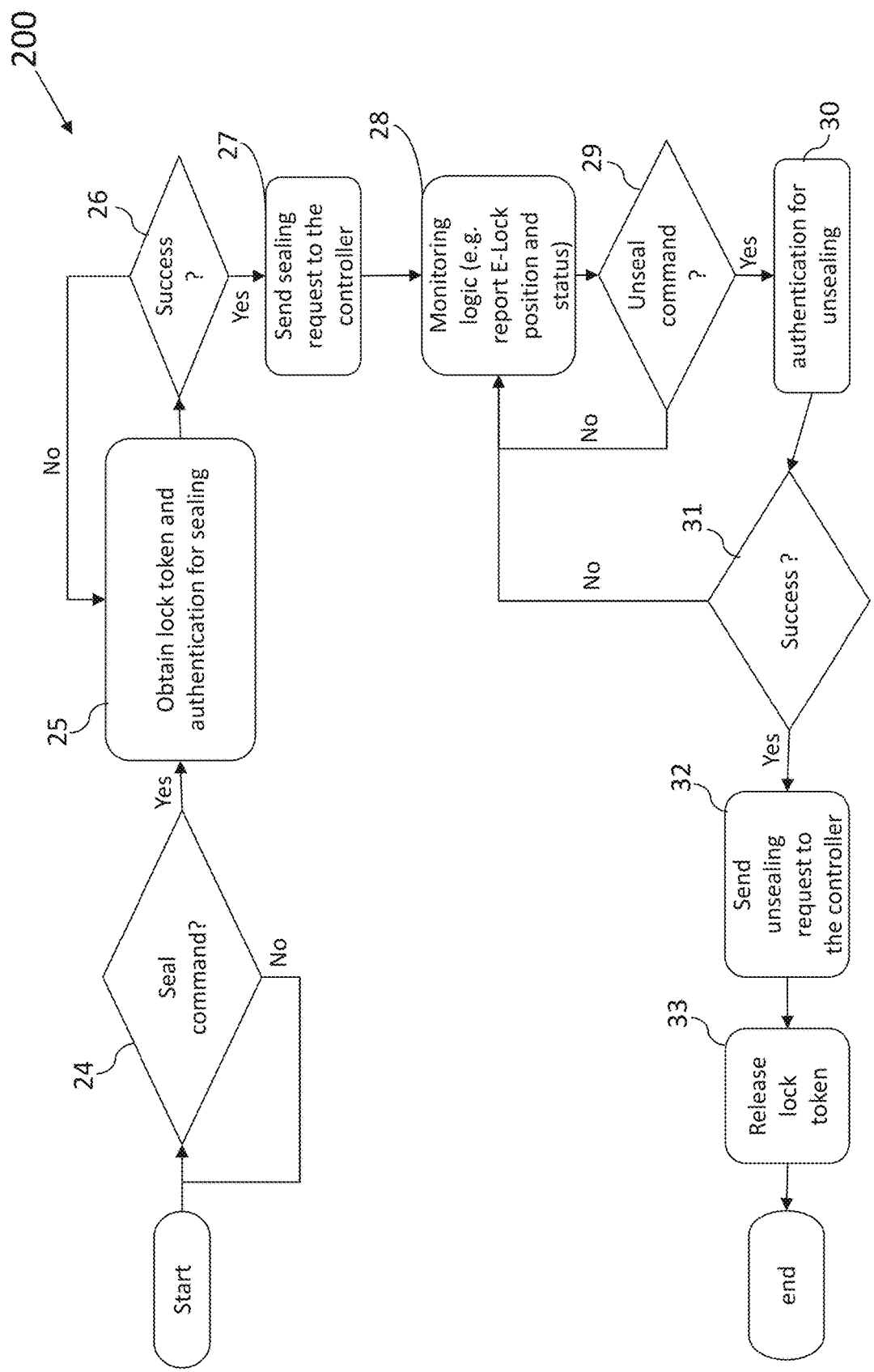
FIG. 4 is a flow diagram showing a tracking logic processed by the controller in the control system of FIG. 1.

With reference to FIG. 4 there is shown an example operation flow of the tracking logic when brought into operation or an active state. When a tracking logic 200 is brought up into execution, it will first go to step 24 which keep looking for a sealing commands received by the electronic lock, e.g. by accessing the register 108 that stores the commands received from the input interface 104.

Once a sealing command 202 is received, it then go to step 25 to obtain a lock token and proceed with the authentication protocol with the sealing command 202. The controller 106 then validates the received command and the associated protocol.

In step 26, in response to a successful validation of the sealing command 202 of a certain protocol managed by the control system, the controller 106 may manipulate the mechanical locking device 102 to operate in the locking state. Only if the lock token can be obtained and the authentication is successful, it may then proceed to step 27 to send a sealing request to the controller 106 which will seal the physical lock 102 accordingly. Neither of them fails will prohibit itself from proceeding to further steps inside the tracking logic.

Once the physical lock 102 is sealed, the status and the position of the electronic lock 102 will be closely monitor through some monitor logic 206 in step 28. Meanwhile, the tracking logic 200 will keep asking the controller 106 if there is any unsealing commands 204 received in step 29.

If there is unsealing command 204 received from the controller 106, it will go to step 30 for authentication. If the unsealing command 204 passes the authentication in step 31, the tracking logic 200 will send an unseal request to the controller 106 to unseal the physical lock 102 in step 32 and also release the lock token to the controller in step 33.

Figure 5:
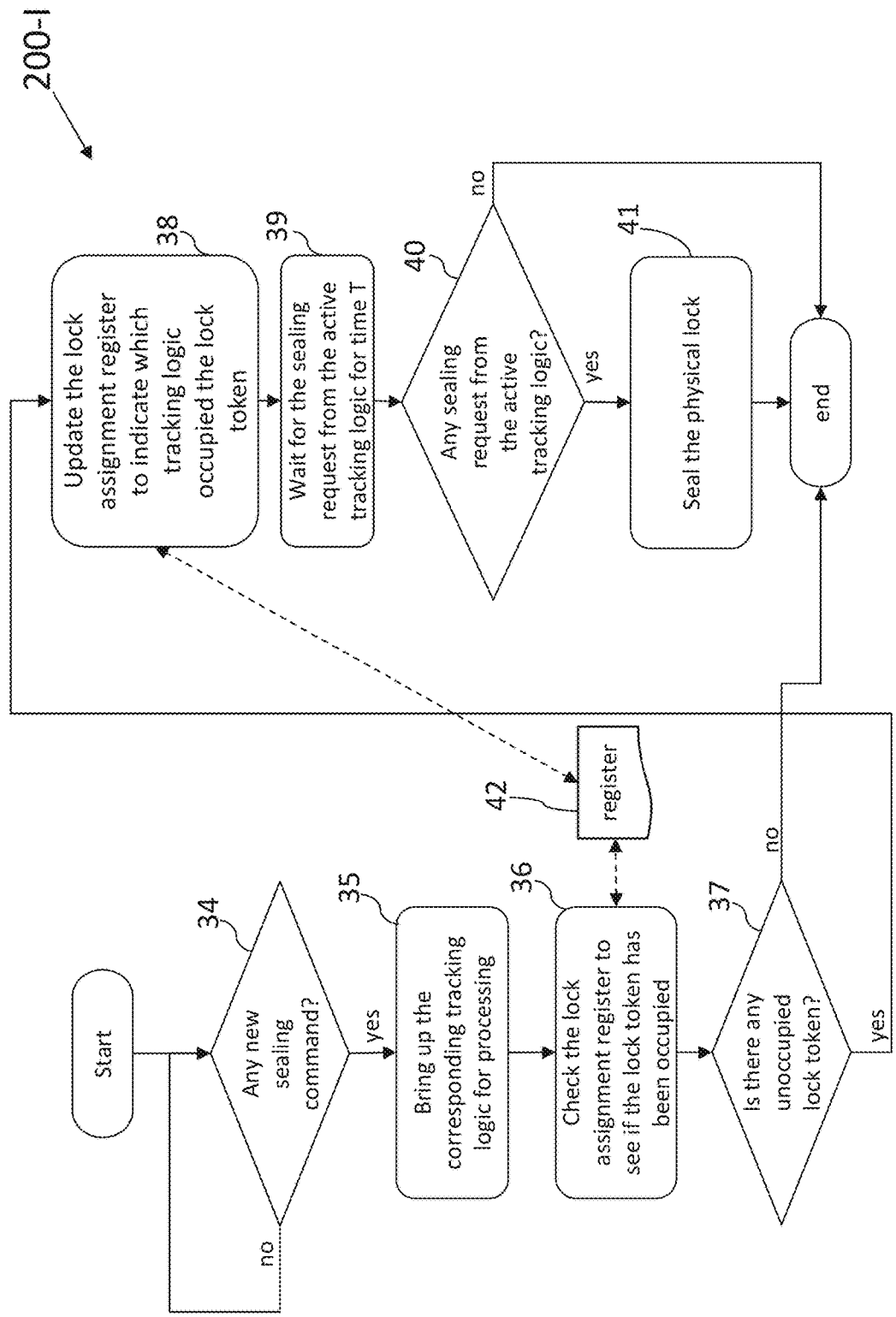
FIG. 5 is a flow diagram showing a sealing operation processed by the controller in the control system of FIG. 1.

With reference to FIG. 5, there is shown an operation flow of sealing operations 200-I. In step 34, the controller keep looking for any new sealing command 202 received from the interface 104 through RFID at sealing command register 108. If there is new coming sealing command 202, the controller 106 first figure out which tracking logic 200 belongs to the sealing command 202 and bring the tracking logic 200 up for execution in step 35.

The controller 106 will then check the lock assignment register 42 to see if there is any free lock token in step 36. The lock assignment register is to store whether the lock token has been occupied and is assigned to which tracking logic if it is occupied.

Then it proceeds to step 37. If there is free or unoccupied lock token, then it will first update the lock assignment register 42 with the tracking logic 200 being processed in step 38. Otherwise, it will exit this logic flow and wait for the next execution of this logic flow.

After updating the lock assignment register 42, the controller 106 will let the tracking logic to perform authentication of the sealing command 202 and wait for the sealing request from the tracking logic 200 for a certain time period in step 39.

In step 40, if the authentication of the sealing command 202 fails, there is no sealing request issued to the controller 106 and thus it will halt the logic flow. Otherwise, it will seal the lock in step 41.

After step 40, the controller 106 is restricted to only validating a first unsealing command 204 of the first protocol after the successful validation of the first sealing command, i.e. the locking system 100 is in a state where the controller 106 may be prohibit to process any incoming command other than the first unsealing command of the first protocol, or it may only be unlockable by inputting the first unsealing command.

Preferably, any unprocessed sealing or unsealing command may be at least temporally stored in the registers 108 for further process. For sealing process, the stored command may be further processed or validated after a successful unsealing operation. For unsealing process, it will be processed only when the physical lock is currently sealed or locked.

Figure 6:
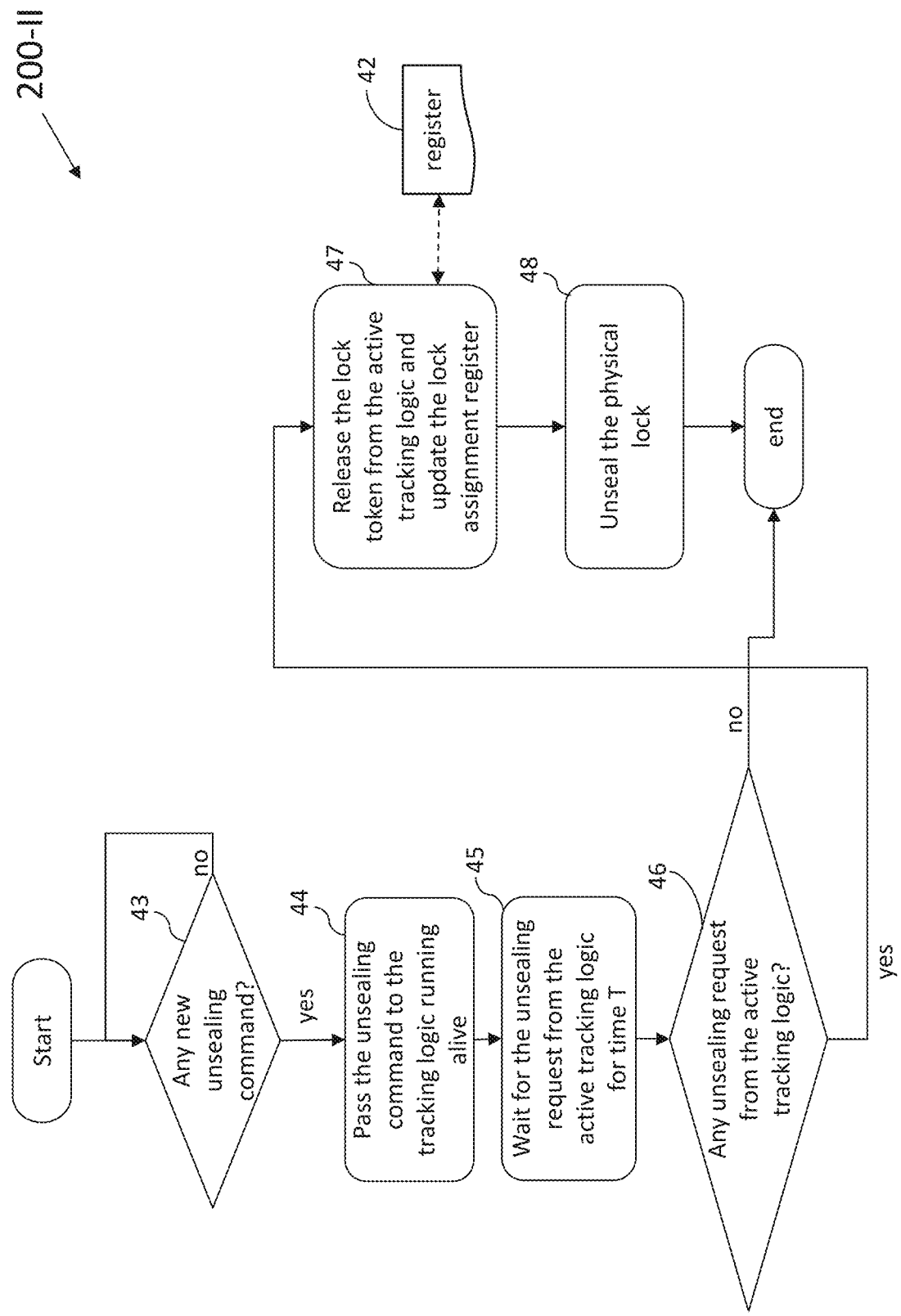
FIG. 6 is a flow diagram showing an unsealing operation processed by the controller in the control system of FIG. 1.

With reference to FIG. 6, there is shown an example operation flow of unsealing operations 200-II. In step 43, the controller 106 keeps looking for any new unsealing command 204 received from the interface 104 through RFID at sealing command register. If there is new coming unsealing command, it will pass it to the active tracking logic 200 for authentication in step 44 and wait for the unsealing request for a period of time in step 45.

If the validation or authentication succeeds, the controller 106 will receive an unseal request from the tracking logic 200 in step 46 and further proceed to step to release the lock token and update the lock assignment register 42. Otherwise, the controller 106 will exit this flow logic and wait for the next execution of this logic flow.

Upon receiving the unsealing request from the active tracking logic 200, the controller 106 will unseal the physical lock accordingly in step 48. Then the operation of the controller 106 is now return to step 24 or 34 as discussed, in which the mechanical lock 102 may be sealed again by providing a sealing command of any security protocol managed by the controller 106. For example, after unsealing the mechanical locking device 102 using the first unsealing command of the first protocol and upon a successful validation of the first unsealing command, the controller 106 may process the next sealing command previously stored in the register when it was still locked using the first security protocol.

In response to a successful validation of the second sealing command of the second protocol, the controller 106 may manipulate the mechanical locking device 102 to operate in the locking state, and the controller 106 is now restricted to only validating a second unsealing command of the second protocol after the successful validation of the second sealing command, i.e. prohibiting any operation associated with commands different from the second unsealing command of the second protocol.

These embodiments may be advantageous in that a single locking device may be use to facilitate logistic managements of objects that may involve multiple stopovers each having different security requirements on sealing/unsealing mechanisms. Advantageously, the controller may process sealing/unsealing commands that belong to different security protocols or tracking logics, therefore eliminating the needs of using multiple sealing tools and/or rechecking the previously secured objects in a multi-stops transhipment, and thus reducing the lead time caused by handovers in different stopovers.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for controlling a mechanical locking device used in logistic management for transporting a secured object from a dispatch location to at least two receipt locations, each receipt location requiring that the object be secured or sealed under a different security protocol, wherein multiple security protocols co-exist in a single locking device so that the locking device may switch between security protocols, the method comprising the steps of:
receiving a command associated with an operation of a mechanical locking device, the mechanical locking device operable in at least a locking state and unlocking state;
validating the received command and a said security protocol associated with the command; and
manipulating the mechanical locking device by executing the received command in response to a successful validation of the received command;
wherein the received command includes at least a sealing command or an unsealing command, the mechanical locking device is sealable by executing the sealing command associated with the said security protocol and is only unsealable upon executing the unsealing command associated with the same said security protocol, such that, when the mechanical locking device is sealed under a first said security protocol, an unsealing command under a second said security protocol is unable to unseal the mechanical locking device, and
wherein each of the at least two different security protocols is independently processed by a controller in the locking device under a respective tracking logic for each of said receipt locations.

2. The method for controlling a locking device in accordance with claim 1, wherein the step of manipulating the mechanical locking device includes the step of manipulating the mechanical locking device to operate in the locking state in response to a successful validation of a first sealing command of a first security protocol.

3. The method for controlling a locking device in accordance with claim 2, wherein the step of manipulating the mechanical locking device further includes the step of manipulating the mechanical locking device to operate in the unlocking state in response to a successful validation of a first unsealing command of the first security protocol.

4. The method for controlling a locking device in accordance with claim 2, wherein the step of validating the received command and the protocol includes the step of restricting validating only a first unsealing command of the first security protocol after the successful validation of the first sealing command.

5. The method for controlling a locking device in accordance with claim 4, further comprising the step of temporarily storing a second sealing command of a second security protocol when the mechanical locking device is operating in the locking state upon successful validation of the first sealing command.

6. The method for controlling a locking device in accordance with claim 5, further comprising the step of manipulating the mechanical locking device to operate in the locking state in response to a successful validation of the second sealing command of the second security protocol, after a successful validation of the first unsealing command.

7. The method for controlling a locking device in accordance with claim 6, wherein the step of validating the received command with the active security protocol further includes the step of restricting validating only a second unsealing command of the second security protocol after the successful validation of the second sealing command.

8. The method for controlling a locking device in accordance with claim 1, further comprising the step of decoding a data packet including the received command and at least temporally storing the received command.

9. The method for controlling a locking device in accordance with claim 8, wherein the data packet includes an RFID data packet.

10. A control system for a mechanical locking device used in logistic management for transporting a secured object from a dispatch location to at least two receipt locations, each receipt location requiring that the object be secured or sealed under different security protocols, the control system comprising:
a memory in which multiple security protocols co-exist, so that the locking device may switch between security protocols;
an interface arranged receive a command associated with an operation of a mechanical locking device, wherein the mechanical locking device is operable in at least a locking state and an unlocking state; and
a controller arranged to validate the received command with an active security protocol of the multiple security protocols, and to manipulate the mechanical locking device, executing the received command, based on a successful validation result of the received command;
wherein the received command includes at least a sealing command or an unsealing command, the mechanical locking device is sealable by executing the sealing command associated with the active security protocol and is only unsealable upon executing the unsealing command associated with the same security protocol, such that, when the mechanical locking device is sealed under a first said security protocol, an unsealing command under a second said security protocol is unable to unseal the mechanical locking device, and
wherein each of the at least two security protocols is independently processed by a controller in the locking device under a respective tracking logic for each of said receipt locations.

11. The control system for a locking device in accordance with claim 10, wherein the controller is arranged to manipulate the mechanical locking device to operate in the locking state in response to a successful validation of a first sealing command of a first security protocol.

12. The control system for a locking device in accordance with claim 11, wherein the controller is further arranged to manipulate the mechanical locking device to operate in the unlocking state in response to a successful validation of a first unsealing command of the first security protocol.

13. The control system for a locking device in accordance with claim 11, wherein the controller is further arranged to restrict to only validating a first unsealing command of the first security protocol after the successful validation of the first sealing command.

14. The control system for a locking device in accordance with claim 13, further comprising a register arranged to temporarily storing a second sealing command of a second security protocol when the mechanical locking device is operating in the locking state upon successful validation of the first sealing command.

15. The control system for a locking device in accordance with claim 14, wherein the controller is further arranged to manipulate the mechanical locking device to operate in the locking state in response to a successful validation of the second sealing command of the second security protocol, after a successful validation of the first unsealing command.

16. The control system for a locking device in accordance with claim 15, wherein the controller is further arranged to restrict to only validating a second unsealing command of the second security protocol after the successful validation of the second sealing command.

17. The control system for a locking device in accordance with claim 10, further comprising a decoder arranged to decode a data packet including the received command.

18. The control system for a locking device in accordance with claim 10, further comprising at least one register arranged to store the received command for further processing.

19. The control system for a locking device in accordance with claim 18, wherein the at least one register is further arranged to store a lock token to indicate a current state of the mechanical locking device.

20. The control system for a locking device in accordance with claim 18, wherein the at least one register is further arranged to maintain a tracked record associated with the operation of the operation of the mechanical locking device and/or the validation result.

21. The control system for a locking device in accordance with claim 10, wherein the interface includes at least one of a wireless communication interface and a manual input interface.

22. The control system for a locking device in accordance with claim 21, wherein the wireless communication interface includes an RFID communication interface.

23. A locking device for use in logistic management, comprising:
a mechanical locking device arranged to secure an object when operating in the locking state; and
a control system in accordance with claim 10.

24. A locking device in accordance with claim 23, further comprising a tracking device arranged to track a position of the object secured by the mechanical locking device.

* * * * *